United States Patent

Deteresa et al.

[11] Patent Number: 5,758,549
[45] Date of Patent: Jun. 2, 1998

[54] INTERFACE STRUCTURE FOR HUB AND MASS ATTACHMENT IN FLYWHEEL ROTORS

[75] Inventors: Steven J. Deteresa, Livermore; Scott E. Groves, Brentwood, both of Calif.

[73] Assignee: Regents of the University of California, Oakland, Calif.

[21] Appl. No.: 649,403

[22] Filed: May 17, 1996

[51] Int. Cl.⁶ .................................................. G05G 1/00
[52] U.S. Cl. .................................................. 74/572
[58] Field of Search .................. 74/572–574; 29/889.21

[56] References Cited

U.S. PATENT DOCUMENTS

| | | | |
|---|---|---|---|
| 2,857,094 | 10/1958 | Erwin | 230/134 |
| 3,279,967 | 10/1966 | Martin et al. | 156/172 |
| 3,403,844 | 10/1968 | Stoffer | 230/134 |
| 3,505,717 | 4/1970 | Palfreyman | 29/156.8 |
| 3,675,294 | 7/1972 | Palfreyman et al. | 23/156.8 R |
| 3,718,087 | 2/1973 | Sokolov | 101/147 |
| 4,679,485 | 7/1987 | Nelson et al. | 89/36.02 |
| 5,346,570 | 9/1994 | Warden et al. | 156/191 |
| 5,614,777 | 3/1997 | Bitterly et al. | 310/74 |

Primary Examiner—Vinh T. Luong
Attorney, Agent, or Firm—L. E. Carnahan; Henry P. Sartorio

[57] ABSTRACT

An interface structure for hub and mass attachment in flywheel rotors. The interface structure efficiently transmits high radial compression forces and withstands both large circumferential elongation and local stresses generated by mass-loading and hub attachments. The interface structure is comprised of high-strength fiber, such as glass and carbon, woven into an angle pattern which is about 45° with respect to the rotor axis. The woven fiber is bonded by a ductile matrix material which is compatible with and adheres to the rotor material. This woven fiber is able to elongate in the circumferential direction to match the rotor growth during spinning.

19 Claims, 1 Drawing Sheet

INTERFACE STRUCTURE FOR HUB AND MASS ATTACHMENT IN FLYWHEEL ROTORS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to flywheels, particularly to flywheels rotors, and more particularly to an interface structure for a flywheel rotor which enables the rotor to withstand centrifugal forces exerted by hub attachments and/or mass-loading materials.

Flywheels are being widely considered for energy storage and/or energy conversion devices, as well as in light-weight power sources.

A critical problem in developing flywheel energy storage and conversion devices is the stresses generated on the inner diameter of the rotor due to centrifugal forces exerted by hub attachments and/or mass-loading materials. Depending on the inner diameter of the rotor due to centrifugal forces exerted by hub attachments and/or mass-loading materials. Depending on the particular design, this surface of the rotor may experience high radial compression forces, high circumferential strains, and localized shear and indentation forces. For a durable rotor design, the material or structure used in this region between the hub and mass-loading materials and the rotor must be able to accommodate these forces and deformations repeatedly without succumbing to catastrophic fatigue failure.

The present invention solves the above-referenced need by providing a durable interface structure for the hub and mass attachment in flywheel rotors. The interface structure efficiently transmits high radial compression forces and withstands both large circumferential elongation and local stresses generated by mass-loading and hub attachments. The interface structure is composed of a high-strength fiber woven into an angle pattern and bonded by a material which is compatible with and adheres to the rotor material.

SUMMARY OF THE INVENTION

It is an object of the present invention to overcome stresses generated on an inner diameter of a rotor due to centrifugal forces exerted by hub attachments and/or mass-loading materials.

A further object of the invention is to provide an interface structure between the rotor and the hub or mass attached thereto.

A further object of the invention is to provide an interface structure for a flywheel rotor which transmits high radial compression forces and withstands both large circumferential elongation and local stresses generated by mass-loading and hub attachments.

Another object of the invention is to provide an interface structure for rotors comprises of high-strength fiber woven into an angle pattern where the angle is about 45° relative to the axis of the rotor.

Another object of the invention is to provide an interface structure for rotors composed of woven fiber and bonded by a ductile matrix material whereby the volume percentage of the fiber is about 55–65% of the structure.

Other objects and advantages of the invention will become readily apparent from the following description and accompanying drawings. The invention is a durable interface structure for hub and mass attachment in flywheel rotors. The interface structure of this invention is constructed so as to accommodate forces and deformations between hub and/or mass-loading materials and the rotor repeatedly without succumbing to catastrophic fatigue failure. The interface structure is composed of high-strength fiber, such as glass and carbon, woven into a $\pm\theta$ pattern where this angle is approximately 45° as measured with respect to the rotor axis, and the woven fiber is bonded by a ductile matrix material, such as epoxies or thermoplastics, which is compatible with and adheres to the rotor material. The volume percentage of fiber in the interface structure should be approximately 55–65%, and the structure can be fabricated using standard filament-winding or fiber placement techniques. By use of the interface structure, various applications can be effectively utilized, such as flywheel-based energy storage or conversion devices including uninterruptable power supplies and electrical power grid reservoirs, as well as in electromechanical batteries for transportation in particular, and light-weight power sources in general.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention involves an interface structure for rotors, such as flywheel rotors, which is located intermediate the rotor body and attachments thereto, such as hubs and mass attachments, and thereby eliminate or reduce the critical problem in flywheel rotors involving stresses generated on the inner diameter of the rotor due to centrifugal forces exerted by hub attachments and/or mass-loading material. The interface structure of the present invention is capable of accommodating high radial compression forces, high circumferential stains, and localized shear and indentation forces which occur on the inner surface of the rotor due to attachments thereto. The interface structure is located intermediate the rotor and the hub and mass-loading materials, and is constructed of material which can withstand these forces and deformations repeatedly without succumbing to catastrophic fatigue failure. The interface structure is composed of high-strength fiber, such as glass, carbon, polyethylene and aramid, woven into a $\pm\theta$ pattern where this angle is about 30° to 60°, preferably 45°, measured with respect to the rotor or cylindrical axis, and bonded by a ductile matrix material, such as epoxy, thermoset, or thermoplastic, which is compatible with and adheres to the rotor materials. The volume percentage of fiber within the interface structure should be about 55–65%. The interface structure can be fabricated using standard filament-winding or fiber placement techniques. This woven fiber structure is able to elongate in the circumferential direction to match the rotor growth during spinning. It is also a tough, damage-tolerant and fatigue-resistant structure when fabricated using high-strength fibers woven at the above-described angles and ductile matrix bonding materials. Furthermore, fiber composites reinforced with the cross-woven pattern are known to have exceptional through-thickness (radial direction) strength and are thus able to withstand the high centrifugal compression forces generated by mass-loading materials or hub attachments.

Figure 2:
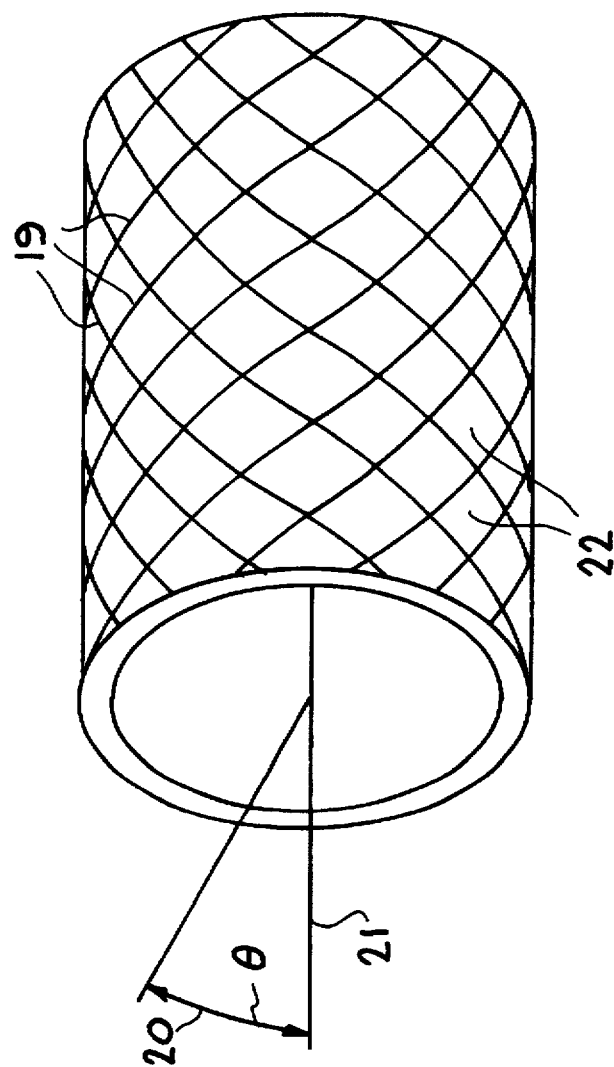
FIG. 2 is a side view of the interface structure of FIG. 1 and made in accordance with the present invention.
Figure 1:
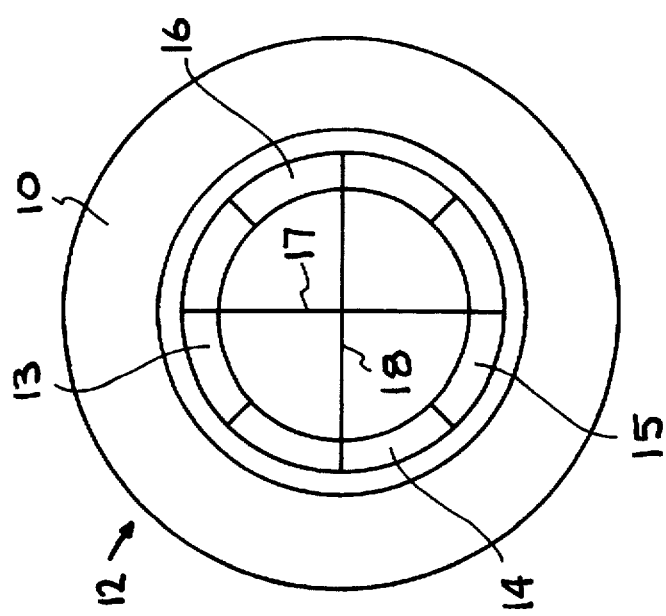
FIG. 1 is an end view of a flywheel rotor which incorporates the interface structure of the present invention.

Referring now to the drawings, FIG. 1 is an end view of a flywheel rotor incorporating the interface structure of the present invention, while FIG. 2 is an enlarged side view of an embodiment of the interface structure of FIG. 1. As seen in FIG. 1 a rotor 10 and is provided with an interface structure 11 intermediate the rotor a mass 12 composed of material sections 13, 14, 15, and 16 secured to said structure 11. A vertical and horizontal axis of the rotor 10 are illustrated at 17 and 18, respectively. As seen in FIG. 2, the interface structure 11 is composed of cross-woven fibers 19 which are woven into a ±θ pattern, indicated at 20, which angle is measured with respect to the cylindrical or longitudinal axis 21 of structure 11. Angle θ is preferably 45° but may range from 30° to 60°. The cross-woven fibers 19 are bonded by a ductile matrix material, indicated at 22, to produce a durable structure. The bonding material 22 must be compatible with and must adhere to the rotor 10.

By way of example, with a rotor 10 being constructed of carbon and glass fibers with epoxy, the interface structure 11 is composed of glass fibers 19 having a diameter of 5 to 10 μm, cross-woven at an angle θ of 45°, and bonded by a ductile epoxy, so as to produce a structure thickness of about 0.01" to 0.10", with a volume percentage of fiber in the structure 11 being 55–65%. As pointed out above, the interface structure 11 can be fabricated using standard filament-winding or fiber placement techniques, and thus a description of such known techniques is not set forth.

It has thus been shown that the present invention overcomes the critical problem in flywheel energy storage and conversion devices involving stresses generated on the inner diameter of the flywheel rotor due to centrifugal forces exerted by hub attachments and/or mass-loading materials. This is accomplished by an interface structure composed of cross-woven high-strength fiber, woven at a specified angle and bonded by a ductile matrix material.

While a specific embodiment of the invention and specific materials and parameters have been illustrated and/or described, such are not intended to be limiting. Modifications and changes may become apparent to those skilled in the art, and it is intended that the invention be limited only by the scope of the appended claims.

The invention claimed is:

1. In a flywheel rotor, the improvement comprising:
interface means mounted within the rotor which transmits radial compression forces and withstands both circumferential elongation and local stresses generated by at least one of mass-loading and hub attachments.

2. The improvement of claim 1, wherein said interface means comprises a structure composed of cross-woven fibers.

3. The improvement of claim 2, wherein said cross-woven fibers are woven at an angle of about 30° to 60° with respect to an axis of the rotator.

4. The improvement of claim 3, wherein said angle is about 45°.

5. The improvement of claim 2, wherein said cross-woven fibers are selected from the group consisting of glass, carbon, polyethylene, and aramid.

6. The improvement of claim 2, wherein said cross-woven fibers are bonded by a ductile matrix material compatible with and which adheres to material of said rotor.

7. The improvement of claim 6, wherein said ductile matrix material is selected from the group consisting of epoxies, thermosets, and thermoplastics.

8. An interface structure positioned between a rotor and a mass within the rotor, said interface structure comprising:
cross-woven fibers bonded by a ductile matrix material, said cross-woven fibers being woven at an angle with respect to a longitudinal axis thereof.

9. The interface structure of claim 8, wherein said fibers are composed of material selected from the group consisting of glass, carbon, polyethylene, and aramid.

10. The interface structure of claim 8, wherein said ductile matrix material is selected from the group consisting of epoxies, thermosets, and thermoplastics.

11. The interface structure of claim 8, wherein said angle is in the range of 30° to 60°.

12. The interface structure of claim 8, wherein said fibers comprise a 55–65% volume of the structure.

13. A flywheel including:
a rotor,
an interface structure within said rotor, and
a mass secured to said interface structure.

14. The flywheel of claim 13, wherein said interface structure includes cross-woven fibers.

15. The flywheel of claim 14, wherein said cross-woven fibers are woven at an angle with respect to the longitudinal axis of said interface structure.

16. The flywheel of claim 14, wherein said cross-woven fibers are bonded by a ductile matrix material compatible with and which adheres to said rotor.

17. The flywheel of claim 14, wherein said fibers are selected from the group consisting of glass, carbon, polyethylene, and aramid.

18. The flywheel of claim 15, wherein said angle of said cross-woven fibers is in the range of 30° to 60°.

19. The flywheel of claim 14, wherein said cross-woven fibers comprise a 55–65% volume of said interface structure.

* * * * *